United States Patent
Peisa et al.

(10) Patent No.: US 9,241,310 B2
(45) Date of Patent: *Jan. 19, 2016

(54) METHOD AND ARRANGEMENT IN A COMMUNICATION SYSTEM

(71) Applicant: TELEFONAKTIEBOLAGET L M ERICSSON (PUBL), Stockholm (SE)

(72) Inventors: Janne Peisa, Espoo (FI); Stefan Wager, Espoo (FI); Johan Torsner, Kyrkslätt (FI); Mats Sågfors, Kyrkslätt (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,141

(22) Filed: Mar. 17, 2014

(65) Prior Publication Data

US 2014/0194108 A1    Jul. 10, 2014

Related U.S. Application Data

(63) Continuation of application No. 12/377,971, filed as application No. PCT/SE2007/050447 on Jun. 20, 2007, now Pat. No. 8,718,695.

(30) Foreign Application Priority Data

Aug. 18, 2006   (SE) ...................................... 0601713

(51) Int. Cl.
*H04B 7/00*    (2006.01)
*H04W 52/02*   (2009.01)

(52) U.S. Cl.
CPC ...... *H04W 52/0225* (2013.01); *H04W 52/0229* (2013.01); *H04W 52/0235* (2013.01); *Y02B 60/50* (2013.01)

(58) Field of Classification Search
CPC ..... H04W 72/12; H04W 76/021; H04W 8/02; H04W 36/0055; H04W 76/046
USPC ........................................... 455/522; 370/318
See application file for complete search history.

(56) References Cited

U.S. PATENT DOCUMENTS

| | | | | |
|---|---|---|---|---|
| 7,693,104 B2 * | 4/2010 | Farnsworth | ......... | H04W 52/146 370/329 |
| 7,693,519 B2 * | 4/2010 | Farnsworth | ......... | H04W 76/064 370/331 |

(Continued)

FOREIGN PATENT DOCUMENTS

| WO | WO 2005/006829 A2 | 1/2005 |
|---|---|---|
| WO | WO2005/079085 | 8/2005 |

OTHER PUBLICATIONS

3rd Generation Partnership Project; Technical specification Group Radio Access Network; Radio Resource Control (RRC); Protocol Specification (Release 6). 3GPP TS 25.331, v6.10.0. Jun. 1, 2006.

(Continued)

*Primary Examiner* — Bobbak Safaipour
(74) *Attorney, Agent, or Firm* — Roger S. Burleigh

(57) ABSTRACT

The present invention relates to a method and an arrangement for reducing a state transition time from a power saving state for a user equipment (18) in a communication network. The state transition time is reduced by retaining in the user equipment (18) one or more information parameter, such as the radio network temporary identifier for a high speed downlink shared channel (H-RNTI), when performing a state transition to said power saving state so as to enable a time reduction when said user equipment switches back from said power saving state.

16 Claims, 7 Drawing Sheets

(56) References Cited

U.S. PATENT DOCUMENTS

| | | | |
|---|---|---|---|
| 7,873,324 B2* | 1/2011 | Wu | H04B 17/336 370/252 |
| 7,929,921 B2* | 4/2011 | Love | H04B 7/0814 375/148 |
| 8,218,479 B2* | 7/2012 | Barriac | H04W 52/146 370/328 |
| 8,238,289 B2* | 8/2012 | Prakash | H04L 1/0028 370/328 |
| 8,248,950 B2* | 8/2012 | Ulupinar | H04L 1/0028 370/237 |
| 2003/0050097 A1 | 3/2003 | Amirijoo et al. | |
| 2004/0253955 A1* | 12/2004 | Love | H04B 7/0814 455/442 |
| 2005/0266799 A1 | 12/2005 | Hara et al. | |
| 2005/0282573 A1 | 12/2005 | Maeno | |
| 2006/0098599 A1 | 5/2006 | Choi | |
| 2006/0240766 A1* | 10/2006 | Wilde | H04W 52/32 455/3.01 |
| 2007/0060153 A1 | 3/2007 | Torsner et al. | |
| 2008/0123585 A1* | 5/2008 | Granzow | H04W 72/044 370/320 |

OTHER PUBLICATIONS

Qualcomm Europe: "Fast Resource Allocation in the E-node B". 3GPP Draft, R2-060057. Jan. 5, 2006.

Nokia: "Further discussion on delay enhancements in Re17" 3GPP Draft; R2-061189 Cell_Fach Enhancement, 3rd Generation Partnership Project (3GPP), Mobile Competence Centre; 650 Route Des Lucioles; F-06921 Sopia-Antipolis Cedex; France; vol. RAN WG2, no. Shanghai, China; May 4, 2006 XP050131139.

* cited by examiner

METHOD AND ARRANGEMENT IN A COMMUNICATION SYSTEM

CROSS-REFERENCE TO RELATED APPLICATIONS

This application is a continuation of U.S. application Ser. No. 12/377,971, filed Jun. 9, 2010, now pending, which was the National Stage of International Application No. PCT/SE07/50447, filed Jun. 20, 2007, which claims the benefit of Swedish Application No. 0601713-1, filed Aug. 18, 2006, the disclosure of which is incorporated herein by reference.

TECHNICAL FIELD

The present invention relates to a method and arrangement in a communication system and more particular to an arrangement allowing for reducing a state transition time for a user equipment as well as a method for such reduction. The invention also relates to a user equipment provided with the arrangement allowing for reducing a state transition time. The invention further relates to a computer-readable medium containing computer program for reducing a state transition time for a user equipment.

BACKGROUND

In order to maintain a long battery life and save power, user equipments, e.g., in Wideband Code Division Multiple Access (WCDMA) systems can be switched from an active state to a power saving state. The battery life is maximized by switching to the power saving state frequently and quickly. However, if this switching is very frequently performed, the user equipments will often find themselves in the power saving state when they need to transmit data. If the switching is slow, it means that the user-perceived performance will suffer from the inertia that occurs every time a new transmission is commenced.

In the work item "Signalling enhancements for Circuit-Switched (CS) and Packet-Switched (PS) Connections" targeted by the 3rd Generation Partnership Project (3GPP) for Release 7, some enhancements to optimize the signalling have been proposed. In general the focus has been in optimizing the connection set-up time from idle mode.

Also within the scope of High speed packet access (HSPA) evolution it is desirable to reduce the time for transitions from the power saving state. The power saving state can be either CELL_PCH or URA_PCH. The following description mainly focuses on the CELL_PCH state, but similar principles could be applied for the URA_PCH state as well.

The current sequences for an UE initiated transition from the CELL_PCH state to the CELL_PCH state are illustrated in FIGS. 2a and 2b. FIG. 2a illustrates the sequence for a normal transition, while FIG. 2b illustrates the sequence for a direct transition to DCH. In direct transition the information contained in the Radio bearer reconfiguration message is already indicated by the Cell update confirm message (most likely using default parameter values).

In FIG. 2a the radio network controller RNC sends a paging message 210 to the user equipment UE. After a power ramping procedure 215 the UE sends a Cell Update message 220 to the RNC, which is confirmed in a Cell Update Confirm message 225 back to the UE. Then, the UE sends a UTRAN Mobility Information Confirm message 230 to the RNC. The RNC sends a Downlink User Plane Initialisation message 235 to the Node B whereas the Node B sends an Uplink Plane Initialisation message 240 to the RNC and provides a Downlink Transmitter Power On (DL Tx Power On) indication 245 to the UE. Then, the RNC sends a Radio Bearer Reconfiguration message 250 to the UE. If synchronisation in the UE is achieved 255, the UE provides an Uplink Transmit Power On (UL TX Power On) indication 260 to the Node B. If synchronisation has been achieved in the Node B 265, it sends an E-DCH scheduling grant message 270 to the UE. Finally, the UE sends a Radio Bearer Reconfiguration Complete message 275 to the RNC. The time $T_{UE}$ denotes the time interval from which the UE has received data until the Radio Bearer Reconfiguration Complete message has been transmitted to the RNC.

Accordingly, in FIG. 2b the radio network controller RNC sends a paging message 210 to the user equipment UE. After a power ramping procedure 215 the UE sends a Cell Update message 220 to the RNC, which is confirmed in a Cell Update Confirm message 225 back to the UE. Then the RNC sends a Downlink User Plane Initialisation message 235 to the Node B whereas the Node B sends an Uplink Plane Initialisation message 240 to the RNC and provides a Downlink Transmitter Power On (DL Tx Power On) indication 245 to the UE. If synchronisation in the UE is achieved 255, the UE provides an Uplink Transmit Power On (UL TX Power On) indication 260 to the Node B. If synchronisation has been achieved in the Node B 265, it sends an E-DCH scheduling grant message 270 to the UE. Finally, the UE sends a UTRAN Mobility Information Confirm message 280 to the RNC. The time $T_{UE}$ denotes the time interval from which the UE has received data until the UTRAN Mobility Information Confirm message has been transmitted to the RNC.

In both sequences, the Cell Update Confirm message is transmitted on the CCCH over the Forward Access Channel (FACH). In current art, it is not possible to use any other channel than CCCH for the transmission of the Cell Update Confirm message as the Cell Update Confirm message contains the identifier (C-RNTI or H-RNTI) that is needed to set up dedicated connections. C-RNTI is defined for the UE in the particular cell when it is using dedicated channels, while H-RNTI is for HS-DSCH.

The procedures described above in FIGS. 2a and 2b take significant amount of time due to the fact that it is necessary to use CCCH and FACH in order to receive the H-RNTI. It is further necessary to receive information on the allocated downlink and uplink channel (either by using Radio Bearer Reconfiguration or directly in the Cell Update Confirm) before initiating the synchronization procedure.

The main contributions to the switching time come from the transmission of the Cell Update message (including the power ramping), transmission of the Cell Update Confirm message (and, possibly, the UTRAN Mobility Information Confirm and Radio Bearer Reconfiguration message) and from the synchronization. The following shortly describes some known ways to reduce these delays:

1) The Cell Update message could be transmitted faster by either reducing the power ramping or by increasing the transmission rate of the RACH channel. However, these modifications would require significant changes to the existing random access procedure.
2) The data rate of the FACH channel could be increased or the Transmission Time Interval (TTI) shortened in order to reduce the time needed for the Cell Update Confirm message. However, as the size of the Cell Update Confirm message is not very large, an increase of the data rate does not significantly improve the total switching time. Changing of the TTI would require complete redesign of the FACH channel, which is disadvantageous.

3) The synchronization could be done faster by increasing the amount of hardware resources for this purpose. However, this solution increases the manufacturing costs of both the base station and the terminal, which is not desirable.

Thus, it is desirable to shorten the time needed for performing the above-described UE-initiated state transition procedures, in particular for transitions from a power saving state, e.g. the CELL_PCH state, to the CELL_PCH state, while avoiding the disadvantages mentioned above.

SUMMARY

Accordingly, it is an objective with the present invention to provide an improved method of reducing a state transition time from a power saving state for a user equipment in a communication network.

According to a first aspect of the present invention this objective is achieved through a method as defined in the characterising portion of claim 1, which specifies that the state transition time is reduced by a method which performs the step of retaining in said user equipment one or more information parameter when performing a state transition to said power saving state so as to enable a time reduction when said user equipment switches back from said power saving state.

Another objective with the present invention is to provide an improved arrangement for reducing a state transition time from a power saving state for a user equipment in a communication network.

According to a second aspect of the present invention this other objective is achieved through an arrangement as defined in the characterising portion of claim 17, which specifies that the state transition time is reduced by an arrangement comprising means for retaining in said user equipment one or more information parameter when performing a state transition to said power saving state so as to enable a time reduction when said user equipment switches back from said power saving state.

A further objective with the present invention is to provide an improved user equipment for reducing a state transition time from a power saving state.

According to a third aspect of the present invention this further objective is achieved through a user equipment, which specifies that the state transition time is reduced by a user equipment comprising an arrangement comprising means for retaining in said user equipment one or more information parameter when performing a state transition to said power saving state so as to enable a time reduction when said user equipment switches back from said power saving state.

A yet further objective with the present invention is to provide an improved computer-readable medium containing computer program reducing a state transition time from a power saving state for a user equipment in a communication network.

According to a fourth aspect of the present invention this further objective is achieved through a computer-readable medium as defined in the characterising portion of claim 34, which specifies that the state transition time is reduced by a computer program which retain in said user equipment one or more information parameter when performing a state transition to said power saving state so as to enable a time reduction when said user equipment switches back from said power saving state.

Further embodiments are listed in the dependent claims.

Thanks to the provision of a method and an arrangement, which retain in the user equipment such information parameters—also in the power saving state—that are necessary to perform the state transition procedure more efficiently (i.e. avoiding additional signaling from the network to the UE and, thus, being capable to start data transmission procedures earlier), the state transition time is reduced. Examples of said information parameters, whereof one or more can be retained, are given below:

By retaining the H-RNTI also in the CELL_PCH state, it is possible to use a different channel than the CCCH to transmit the Cell Update Confirm message. Especially it is possible to use the HS-DSCH transport channel with short TTI and high data rate.

By retaining the downlink (fractional) DPCCH channelization code and all uplink channelization codes also in the CELL_PCH state, it is possible to start the synchronization procedure immediately after the Cell Update message has been transmitted, thus effectively performing the downlink synchronization in parallel to the message transmission.

Further, user plane configuration (e.g. MAC MAC_e/hs muxing information) in Cell_PCH can be retained both in the RBS and the UE.

It is then an advantage of the present invention that the transition times for switching from a power saving state, e.g. the CELL_PCH state, to the CELL_DCH state can be reduced due to the fact that the Cell Update Confirm message can be transmitted on the HS-DSCH and the synchronisation can be performed during the message transmission time.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
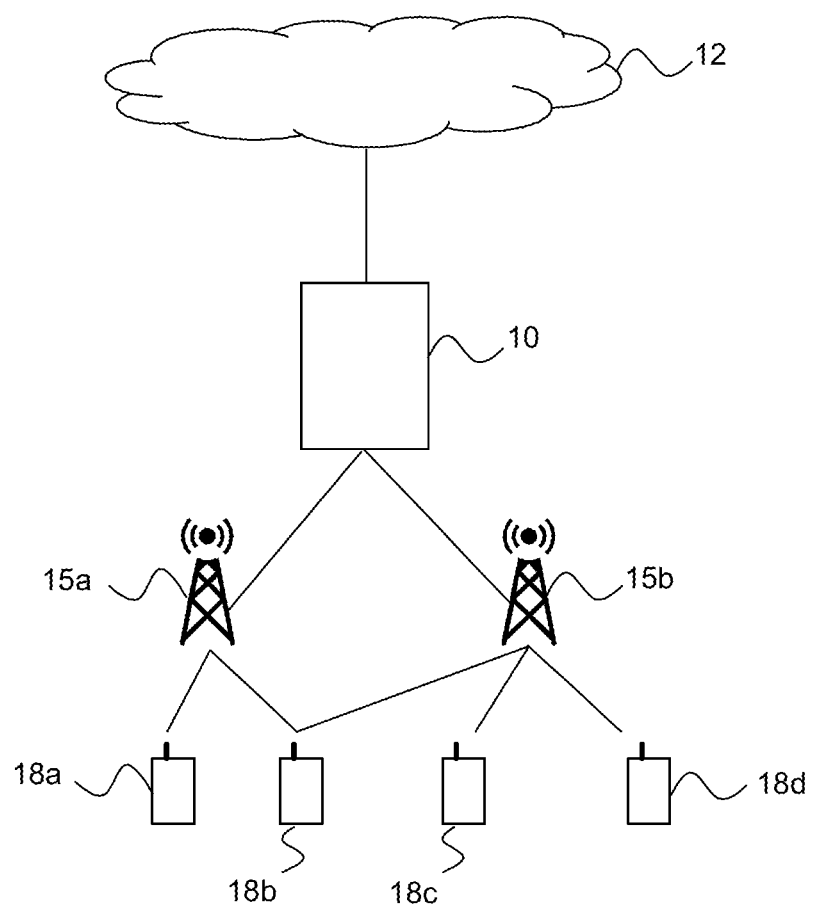
FIG. 1 shows an example of a communication network architecture.
Figure 2A:
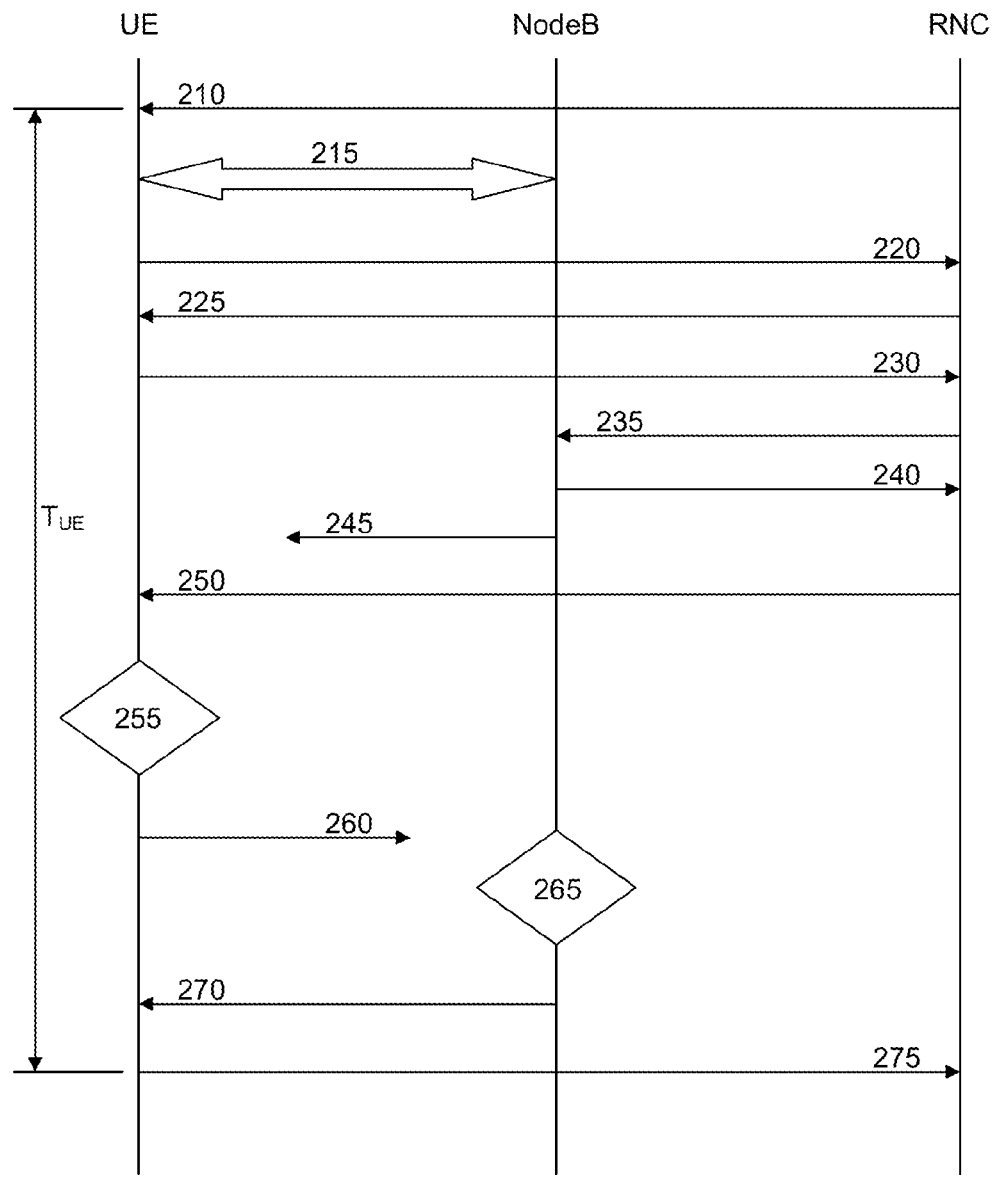
FIG. 2*a* illustrates the normal prior art procedure for transitions from CELL_PCH to CELL_DCH state.
Figure 2B:
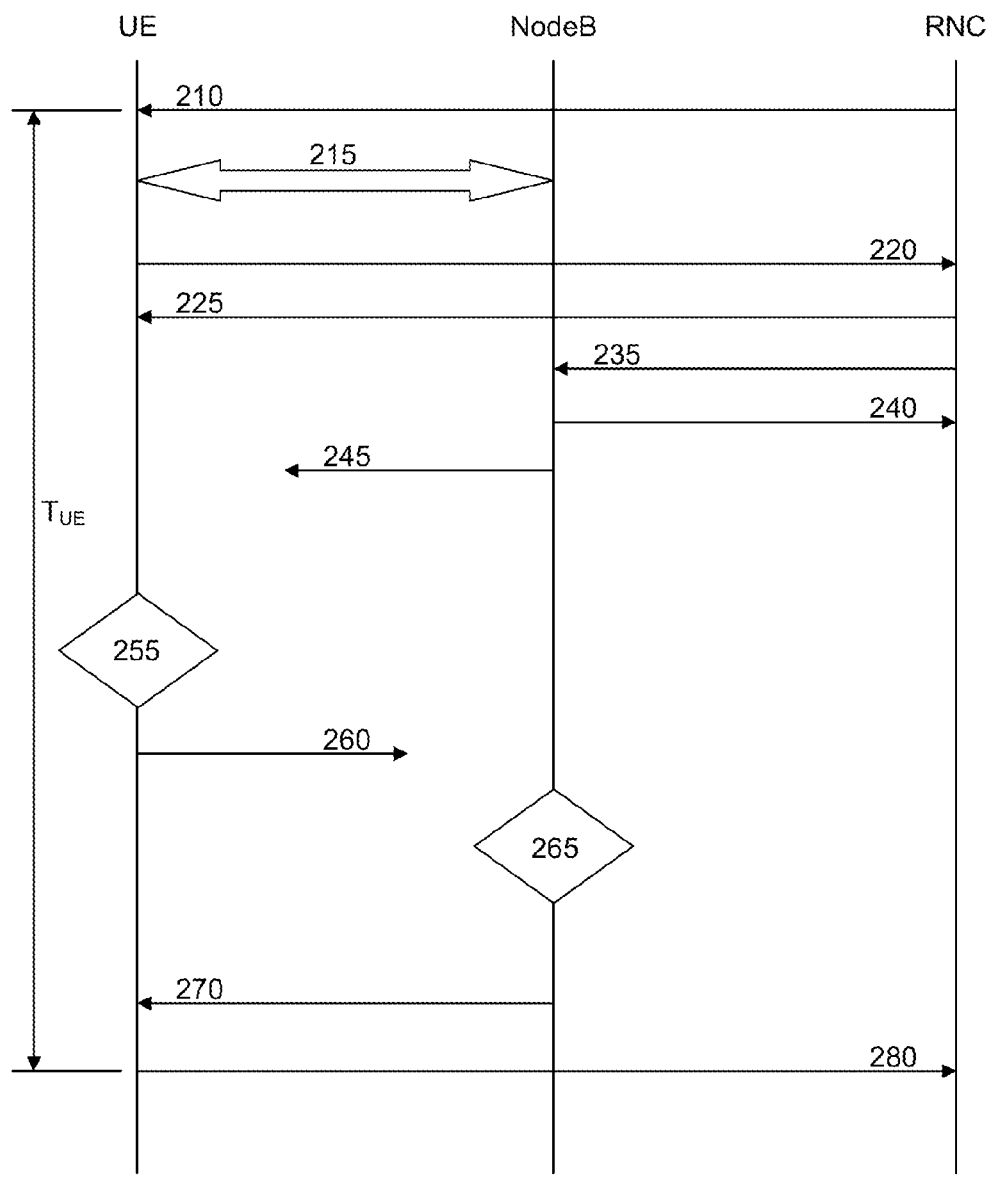
FIG. 2*b* illustrates a direct transition to the CELL_DCH state according to prior art.

FIG. 1 depicts a communication system, such as a Wideband Code Division Multiple Access (WCDMA) system, including a Radio Access Network (RAN), such as the UMTS Terrestrial Radio Access Network (UTRAN) architecture, comprising at least one Radio Base Station (RBS) (or Node B or eNode B) 15*a-b*, connected to one or more Radio Network Controllers (RNCs) 10 (only one shown in FIG. 1). The RAN is connected over an interface such as the Iu-interface to a Core network (CN) 12, which may be a connection-oriented external CN such as the Public Switched Telephone Network (PSTN) or the Integrated Services Digital Network (ISDN), and/or a connectionless external CN as the Internet.

The RAN and the CN 12 provide communication and control for a plurality of user equipments (UE) 18a-d. The UEs 18 each uses downlink (DL) channels (i.e. base-to-user or forward) and uplink (UL) channels (i.e. user-to-base or reverse) to communicate with at least one RBS 15 over a radio or air interface.

According to a preferred embodiment of the present invention, the communication system is herein described as a WCDMA communication system. The skilled person, however, realizes that the inventive method and arrangement work very well on all communications system, such as the Global System for Mobile communications (GSM) or Long Term Evolution (LTE) system. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

Figure 3:
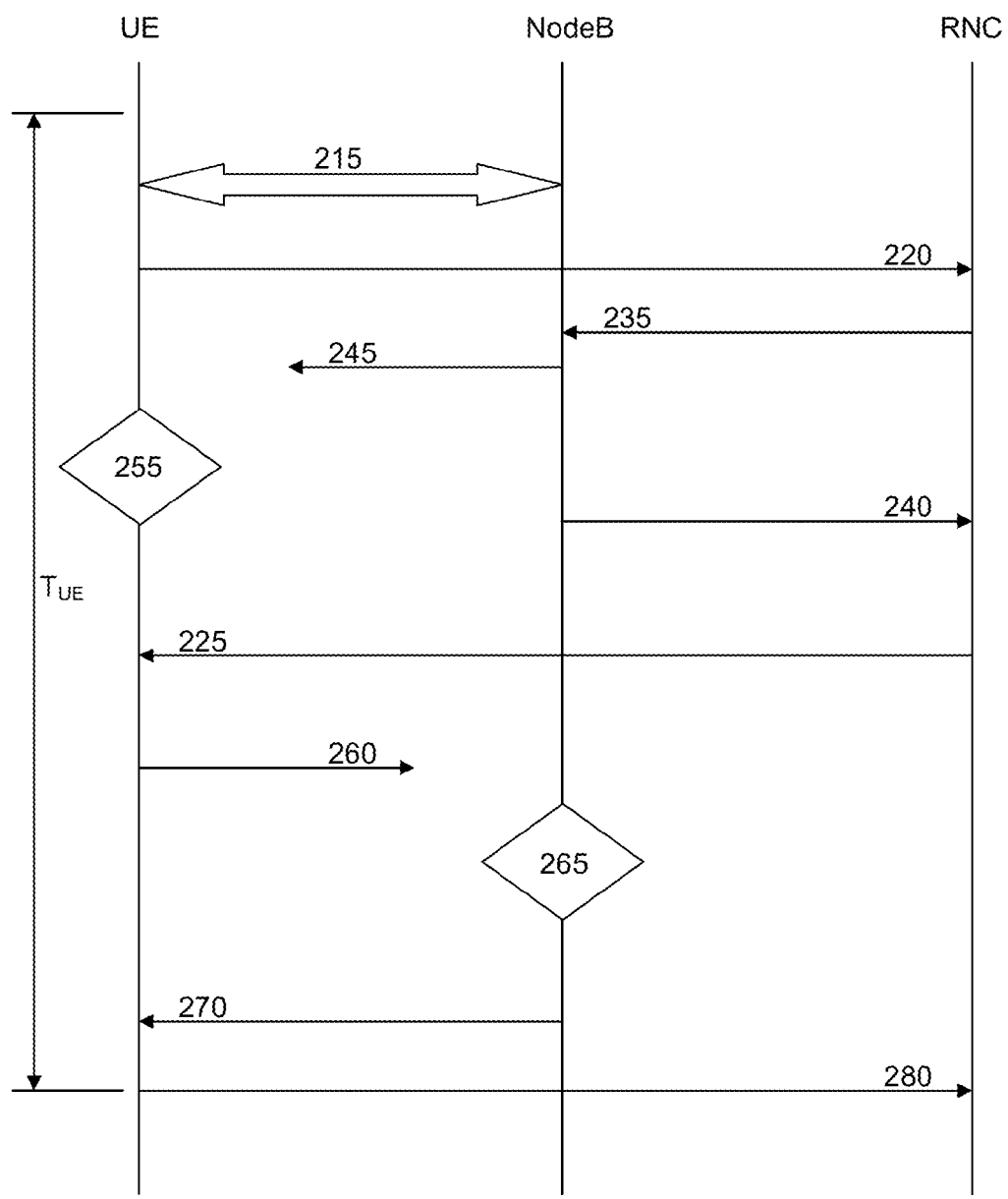
FIG. 3 illustrates the transition from CELL_PCH state to CELL_DCH state according to the present invention.

FIG. 3 shows the sequence to perform fast transition from CELL_PCH to CELL_DCH for direct transition to DCH. After a power ramping 215, user equipment UE sends a Cell Update message 220 or another appropriate message to the radio network controller RNC, which sends a Downlink User Plane Initialization message 235 to the Node B whereas the Node B sends an Uplink Plane Initialisation message 240 to the RNC and provides a Downlink Transmitter Power On (DL Tx Power On) indication 245 to the UE. The RNC sends a Cell Update Confirm message 225 to the UE. The Downlink User Plane Initialization message 235 and the Cell Update Confirm message 225 may be transmitted in parallel, i.e. the transmission of the Cell Update Confirm message 225 does not need to be after the Uplink Plane Initialisation message 240. After that synchronization has been achieved 255 in the UE, the UE provides an Uplink Transmit Power On (UL Tx Power On) indication 260 to the Node B. After that synchronization has been achieved 265 in the Node B, the Node B sends an E-DCH scheduling grant message 270 to the UE. Then, the UE sends a UTRAN Mobility Information Complete message 280 to the RNC. The time $T_{UE}$ denotes the time interval from which the UE has received data until the RNC has received said UTRAN Mobility Information Complete message. The time $T_{UE}$ according to the procedure in FIG. 3 is shorter than in solutions according to the state of the art.

In the inventive method and arrangement for reducing a state transition time, one or more information parameter is retained in said user equipment when performing a state transition to the power saving state so as to enable a time reduction when the user equipment switches back from the power saving state.

In the following there will now be described examples of retained information parameters which can be used separately or in combination.

Figure 4:
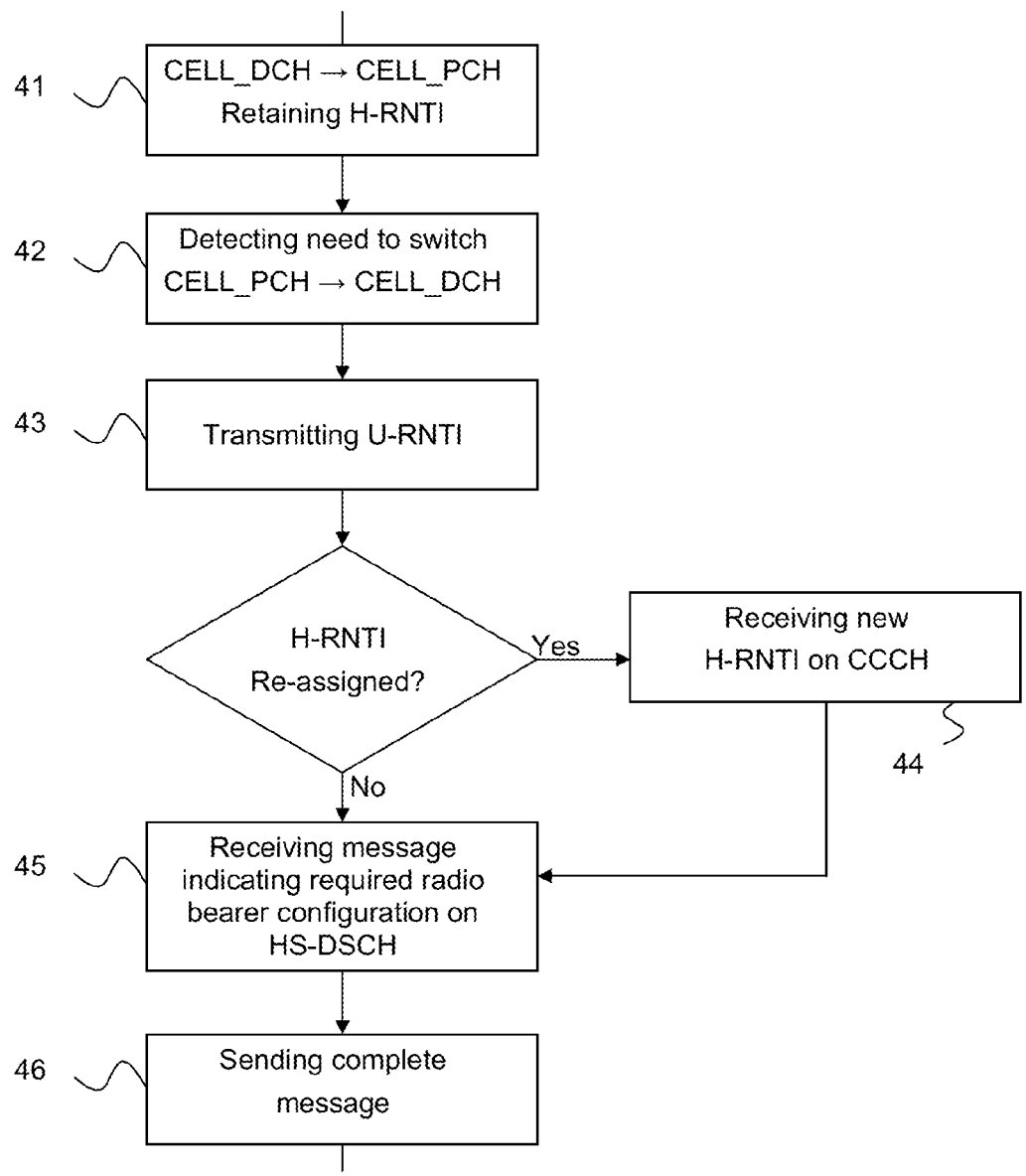
FIG. 4 shows the inventive procedure according to a first preferred embodiment of the present invention.

Thus, according to a first preferred embodiment of the present invention, the HS-DSCH radio network temporary identifier (H-RNTI) is retained in the UE. The procedure in the user equipment for reducing the state transition time, shown in FIG. 4, is as follows:
 1. Retaining the H-RNTI when the UE is switched from the CELL_DCH state to the CELL_PCH state (step 41);
 2. Upon detecting a need to switch back from CELL_PCH to CELL_DCH (step 42), the UE transmits an initial message containing the U-RNTI to the network (step 43). The initial message could be Cell Update or some other message created especially for this purpose. In a preferred embodiment the message can also contain CQI information to help the link adaptation on HS-DSCH;
 3. If the network already has reassigned the H-RNTI, the CCCH must be used to allocate a new H_RNTI (step 44). And, then the UE receives a message indicating the required radio bearer configuration (step 45);
 4. Otherwise, the network, upon receiving the U-RNTI, responds with a message indicating the required radio bearer configuration (step 45). This message can be either Cell Update Confirm as in direct transition to DCH or Radio Bearer Reconfigure message or some other message created especially for this purpose. This message can be transmitted on the HS-DSCH as both the UE and the network know the H-RNTI. However, the HS-DSCH must be operated in a FACH-like mode with no HARQ feedback.
 5. The UE responds by sending a complete message (step 46), either UTRAN Mobility Information Complete or Radio Bearer Reconfiguration Complete.

As a separate embodiment of the invention, the procedure according to 1-5 described above can be performed also for user equipments in the URA_PCH state. This, however, requires a different management of the H-RNTI resources since the network does not know the location of the user equipments on a cell level.

Figure 5:
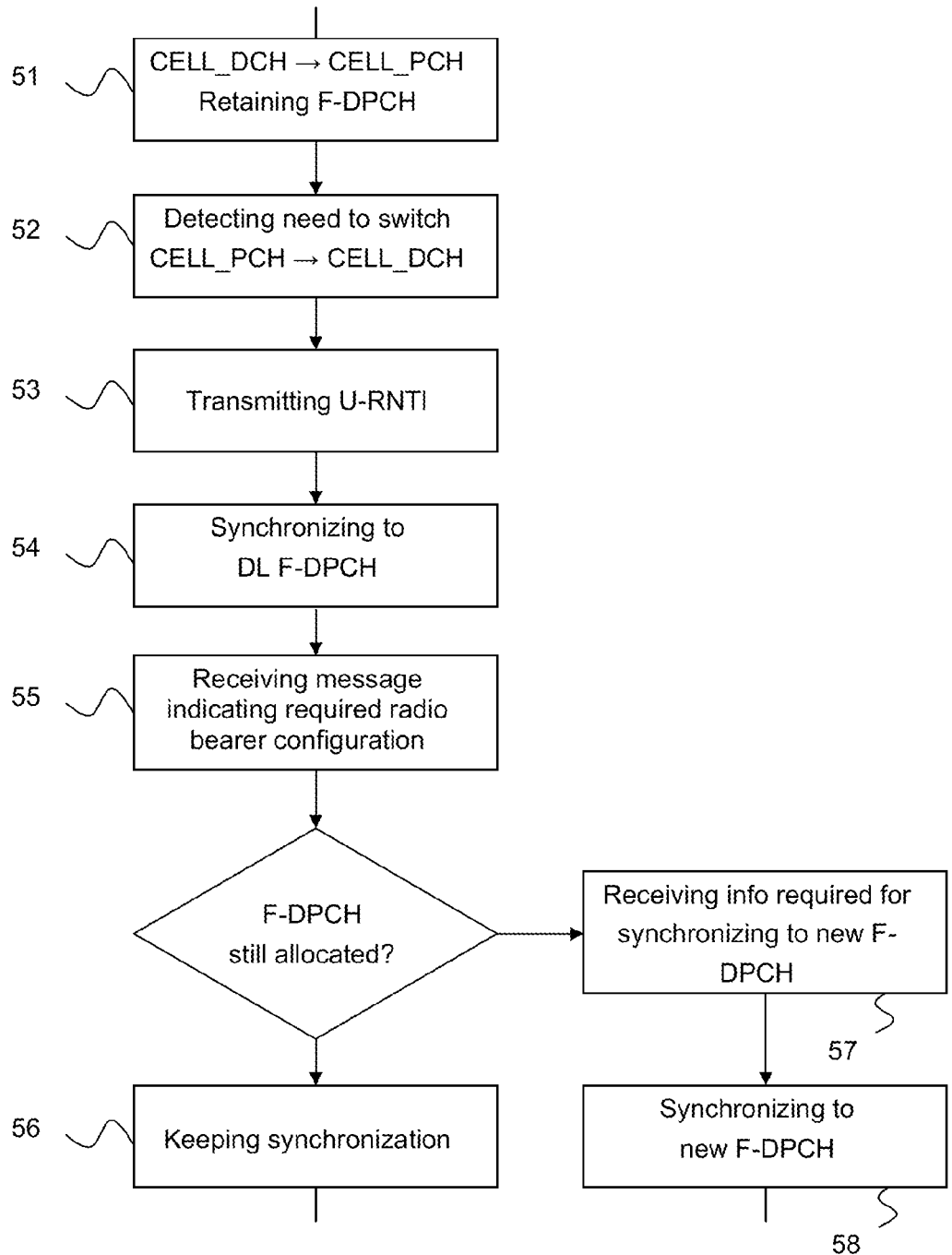
FIG. 5 shows the inventive procedure according to a second preferred embodiment of the present invention.

According to a second preferred embodiment of the present invention the fractional dedicated physical channel (F-DPCH) or the dedicated physical channel (DPCH) is retrained in the UE. The procedure in the user equipment for reducing the state transition time, shown in FIG. 5, is as follows:
 1. Retaining the used fractional DPCH. (Alternatively, it might also be possible to retain an ordinary DPCH) when the UE is switched from the CELL_DCH state to the CELL_PCH state (step 51);
 2. Upon detecting a need to switch back from CELL_PCH to CELL_DCH (step 52), the UE transmits an initial message containing the U-RNTI to the network (step 53). The initial message could be Cell Update or some other message created especially for this purpose;
 3. After the transmission of the initial message, the UE immediately starts to synchronize to the DL (F-)DPCH (step 54);
 4. The network, upon receiving the initial message, responds with a message indicating the current radio bearer configuration (step 55);
 5. If the F-DPCH is still allocated to the UE, it is indicated in this message and the UE reads the radio bearer configuration, and keeps the current synchronization (step 56);
 6. Otherwise, if the network has reallocated the F-DPCH to a new UE, this message will contain the new information required for the UE to synchronize to the new F-DPCH (step 57). In a separate embodiment, the network will inform the UE (by paging) that the F-DPCH has been reallocated when the network allocates the F-DPCH to another UE. The UE reads the radio bearer configuration and performs a new synchronization to the new F-DPCH (step 58).

As a separate embodiment, the network may initiate a release of the F-DPCH of UEs in CELL_PCH.

According to a third preferred embodiment of the present invention the uplink synchronization is retrained in the UE. Thus, by keeping the uplink channelization codes, the UE can start transmitting on DPCCH for UL synchronization directly after it has verified that the uplink channelization codes are still valid. For instance, this happens after that the Cell Update Confirm message has been received.

Figure 6:
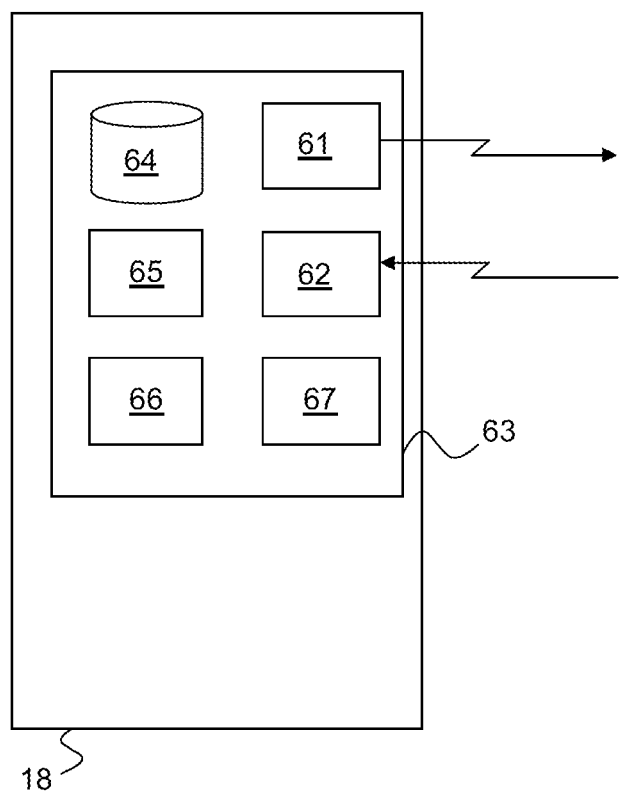
FIG. 6 illustrates a user equipment comprising the inventive arrangement; and, FIG. 7 is an example of a computer-readable medium.

FIG. 6 illustrates a user equipment 18 comprising the inventive arrangement denoted 63. The arrangement 63 comprises a transmitter 61 for transmitting data on uplink channels and a receiver 62 for receiving data on downlink channels. The arrangement also comprises means 64 for retaining the one or more information parameter, discussed above, in the user equipment 18 when performing a state transition to power saving state so as to enable a time reduction when the user equipment 18 switches back from the power saving state. Furthermore, the arrangement 63 comprises detecting means 65 for detecting a need for performing a state transition from the power saving state.

The arrangement 63 also comprises synchronization means 66 which is used when the retained information parameter is the fractional dedicated physical channel (F-DPCH) or the dedicated physical channel (DPCH) according to the second preferred embodiment of the invention. The synchronization means 66 is also used when the information parameter includes uplink channelization codes according to the third preferred embodiment of the invention.

Verification means 67 is also comprised in the inventive arrangement 63, which is used for verifying that the uplink channelization codes are still valid when the information parameter includes uplink channelization codes according to the third preferred embodiment of the invention.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Figure 7:
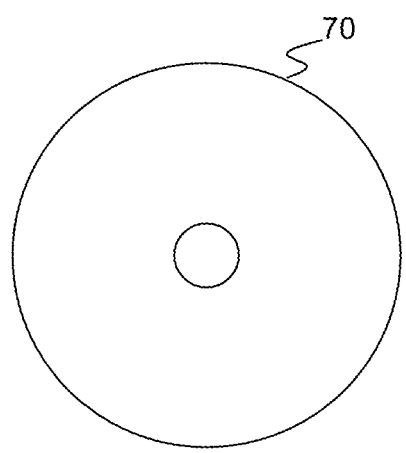

Moreover, the invention can additionally be considered to be embodied entirely within any form of computer-readable storage medium, an example of which is shown in FIG. 7 and denoted 70, having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" 70 can be any means that can contain, store, communicate, propagate, or transport the program for use by or in connection with the instruction-execution system, apparatus or device. The computer-readable medium 70 can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for reducing a state transition time from a power saving state for a user equipment in a communication network is provided, wherein the computer program performs the step of retaining in said user equipment one or more information parameter when performing a state transition to said power saving state so as to enable a time reduction when said user equipment switches back from said power saving state.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method for reducing a state transition time from a power saving state for a user equipment in a communication network, comprising the step of:
   retaining in said user equipment one or more information parameters when performing a state transition to said power saving state so as to enable a time reduction when said user equipment switches back from said power saving state, wherein said one or more information parameters comprise a radio network temporary identifier for a cell (C-RNTI).

2. The method according to claim 1, wherein the method further comprises the steps of:
   detecting a need for performing a state transition from said power saving state;
   transmitting an initial message containing a UTRAN radio network temporary identifier (U-RNTI);
   receiving an indication of a radio bearer configuration from a communication network entity; and,
   responding with a completion message to said communication network entity.

3. The method according to claim 2, wherein said initial message contains channel quality indicator (CQI) information.

4. The method according to claim 2, wherein said initial message is a cell update message.

5. The method according to claim 2, wherein said completion message is one of the following: a radio bearer reconfiguration complete message; or, a UTRAN mobility information complete message.

6. The method according to claim 2, wherein said indication of a radio bearer configuration is a cell update confirm message that is carried on said high speed downlink shared channel and using said retained C-RNTI.

7. The method according to claim 1, wherein said power saving state is a CELL_PCH state.

8. The method according to claim 1, wherein said power saving state is a URA_PCH state.

9. A user equipment adapted to reduce a state transition time from a power saving state, comprising:
   a processor; and,
   a memory, said memory containing instructions which, when executed by said processor, cause said user equipment to:
      retain in said user equipment one or more information parameters when performing a state transition to said power saving state so as to enable a time reduction when said user equipment switches back from said power saving state, wherein said one or more information parameters comprise a radio network temporary identifier for a cell (C-RNTI).

10. The user equipment according to claim 9, wherein said user equipment is further operative to:
   detect a need for performing a state transition from said power saving state;
   transmit an initial message containing a UTRAN radio network temporary identifier (U-RNTI);
   receive an indication of a radio bearer configuration from a communication network entity; and,
   respond with a completion message to said communication network entity.

11. The user equipment according to claim 10, wherein said initial message contains channel quality indicator (CQI) information.

12. The user equipment according to claim 10, wherein said initial message is a cell update message.

13. The user equipment according to claim 10, wherein said completion message is one of the following: a radio bearer reconfiguration complete message; or, a UTRAN mobility information complete message.

14. The user equipment according to claim 10, wherein said indication of a radio bearer configuration is a cell update confirm message that is carried on said high speed downlink shared channel and using said retained C-RNTI.

15. The user equipment according to claim 9, wherein said power saving state is a CELL_PCH state.

16. The user equipment according to claim 9, wherein said power saving state is a URA_PCH state.

* * * * *

UNITED STATES PATENT AND TRADEMARK OFFICE
CERTIFICATE OF CORRECTION

PATENT NO. : 9,241,310 B2  
APPLICATION NO. : 14/216141  
DATED : January 19, 2016  
INVENTOR(S) : Peisa et al.

Page 1 of 1

It is certified that error appears in the above-identified patent and that said Letters Patent is hereby corrected as shown below:

IN THE SPECIFICATION

In Column 1, Line 8, delete "2010, now pending," and insert -- 2010, now Pat. No. 8,718,695, --, therefor.

In Column 1, Line 52, delete 2nd occurrence "CELL_PCH state" and insert -- CELL_DCH state --, therefor.

In Column 3, Line 8, delete 2nd occurrence "CELL_PCH state," and insert -- CELL_DCH state, --, therefor.

Signed and Sealed this
Nineteenth Day of April, 2016

Michelle K. Lee
*Director of the United States Patent and Trademark Office*